United States Patent
Garcia et al.

[11] Patent Number: 5,905,268
[45] Date of Patent: May 18, 1999

[54] INSPECTION LAMP WITH THIN-FILM DICHROIC FILTER

[75] Inventors: Gustavo Garcia, Lake Grove; John T. Duerr, Massapequa Park, both of N.Y.

[73] Assignee: Spectronics Corporation, Westbury, N.Y.

[21] Appl. No.: 08/844,741

[22] Filed: Apr. 21, 1997

[51] Int. Cl.[6] .................................................. G01J 1/00
[52] U.S. Cl. .................................. 250/504 R; 250/493.1
[58] Field of Search .................................. 250/301, 302, 250/504 R, 504 H, 493.1

[56] References Cited

U.S. PATENT DOCUMENTS

| | | | |
|---|---|---|---|
| 2,324,384 | 7/1943 | Grimes | 240/8.16 |
| 2,541,976 | 2/1951 | Bogart | 250/71 |
| 3,711,700 | 1/1973 | Westlund et al. | 362/293 |
| 4,184,196 | 1/1980 | Moret et al. | 433/29 |
| 4,195,329 | 3/1980 | Woog | 362/120 |
| 4,266,535 | 5/1981 | Moret | 128/23 |
| 4,683,379 | 7/1987 | Wolff | 250/493.1 |
| 5,383,776 | 1/1995 | Trail et al. | 250/461.1 |
| 5,412,274 | 5/1995 | Parham | 313/112 |
| 5,453,883 | 9/1995 | Chazallet | 359/890 |
| 5,493,442 | 2/1996 | Buchholz et al. | 359/359 |
| 5,581,356 | 12/1996 | Vezard | 356/418 |
| 5,674,000 | 10/1997 | Kalley | 362/293 |

*Primary Examiner*—Bruce Anderson
*Attorney, Agent, or Firm*—Seidel, Gonda, Lavorgna & Monaco, PC

[57] ABSTRACT

An inspection lamp for detection of a fluorescent material which absorbs electromagnetic energy in a specific excitation frequency band and which emits electromagnetic energy in a specific fluorescent emission frequency band within the visible light spectrum. The lamp includes a bulb housing, a light source within the bulb housing, and a dichroic filter. The dichroic filter is adapted to transmit electromagnetic radiation in the excitation frequency band of the fluorescent material and reflect electromagnetic radiation in the fluorescent emission frequency band of the material.

5 Claims, 2 Drawing Sheets

INSPECTION LAMP WITH THIN-FILM DICHROIC FILTER

FIELD OF THE INVENTION

This invention is related to the general field of inspection lamps for detection of fluorescent materials, and in particular to the field of selective filters for such inspection lamps.

BACKGROUND OF THE INVENTION

Leak detection, materials detection, and qualitative non-destructive testing are well suited to techniques employing fluorescence detection. These techniques rely upon the unique physical property of various materials to fluoresce when excited by certain wavelengths of visible or ultraviolet ("UV") light.

It is a well-known phenomena that electromagnetic energy within the near ultraviolet spectrum of approximately 315 to 400 nanometer wavelengths produces fluorescence in certain materials. That is, the fluorescent materials absorb radiated energy at the near UV or blue wavelengths and re-radiate or emit it at a longer wavelength in the visible spectrum. Thus, when fluorescent material absorbs electromagnetic energy in a specific excitation frequency band in a specific wavelength range, the material can emit electromagnetic energy in a characteristic fluorescent emission frequency band within the visible light spectrum. This phenomena has enabled inspection and detection techniques in which fluorescent dyes, inks or pigments are illuminated by lamps selectively filtered to emit only ultraviolet radiation (invisible to the human eye), and then re-radiate with a high luminescence in the visible spectrum.

For example, the slow leakage of refrigerant from an air conditioning system is difficult to locate by any other means, because the refrigerant escapes as an invisible gas at such low rate and rapid diffusion that the concentration of refrigerant in air near the leak site is difficult to differentiate from that surrounding any other location along the system circulation lines. However, by infusing into the circulating system a small amount of fluorescent dye which is soluble in the refrigerant, the dye is carried out of the system with the refrigerant, and glows brightly at the leak site when the area is swept with a UV lamp.

Currently available inspection lamps employ high intensity light sources operating at very high temperatures to generate a sufficient photon flux for detection applications, and utilize filters to absorb the undesirable wavelengths. These filters are often colored glass which transmit some wavelengths and absorb others. The filters are subjected to significant thermal stress attributed to the high temperature light source and the filter's absorption of light energy. Because of the thermal stress problem, the selection of appropriate materials for a filter are limited. The colored glass filters that are commonly used do not optimize the transmittance of the desirably narrow ultraviolet frequency bandwidth needed to maximize the fluorescence of a particular material.

Another problem with currently available inspection lamps is the tendency for UV colored glass filters to permit transmittance of lower wavelength visible light. These wavelengths interfere with the human eye's perception of light emitted from the fluorescing material. This is a significant limitation in applications where fluorescing material is expected in low concentrations, as in the refrigerant leak example.

Thus, there is a need for an inspection lamp that utilizes a high intensity light source and a filter which will transmit specific wavelengths, while reflecting those which are undesirable. By reflecting undesirable visible light, and transmitting invisible UV light, such a filter can simultaneously maximize a desired transmittance while greatly reducing thermal stress on the filter. A lamp must also be safe to the user and constructed to withstand the rough handling to which it may be exposed. An inspection lamp is also needed that permits the easy substitution of customized filters for differing applications.

SUMMARY OF THE INVENTION

An inspection lamp for detection of a fluorescent material which absorbs electromagnetic energy in a specific excitation frequency band and which emits electromagnetic energy in a specific fluorescent emission frequency band within the visible light spectrum. The lamp includes a bulb housing, a light source within the bulb housing, and a dichroic filter. The dichroic filter is adapted to transmit electromagnetic radiation in the excitation frequency band of the fluorescent material and reflect electromagnetic radiation in the fluorescent emission frequency band of the material.

The dichroic filter in the invention may be adapted to transmit an excitation frequency band in the ultraviolet and visible blue light wavelength range. The dichroic filter may also transmit electromagnetic radiation in the infrared and longer wavelength range.

The dichroic filter may also be attached to the lamp by a filter holder releasably attachable to the bulb housing.

BRIEF DESCRIPTION OF THE DRAWINGS

The drawings show a form of the invention which is presently preferred; however, the invention is not limited to the precise arrangement shown in the drawings.

DETAILED DESCRIPTION OF THE INVENTION

The present invention may be embodied in other specific forms without departing from the spirit or essential attributes thereof and, accordingly, reference should be made to the appended claims, rather than to the foregoing specification, as indicating the scope of the invention.

A hand-held ultraviolet wavelength inspection lamp that optimizes the fluorescent response of a material and mitigates the thermal stress on a filter, thus enabling a more versatile and durable inspection device, is made feasible by the use of an optical thin-film coated dichroic filter.

Figure 1:
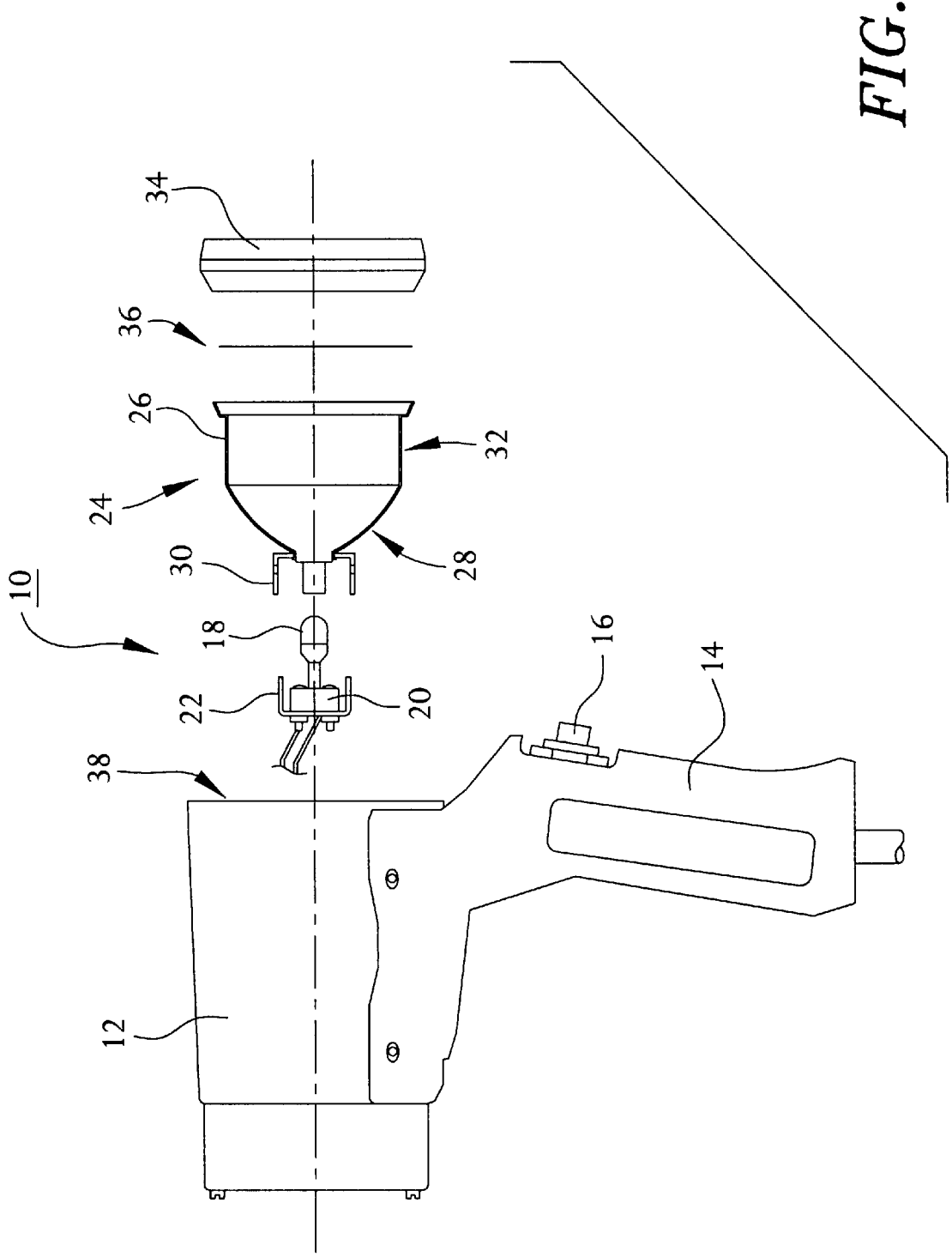
FIG. 1 is an exploded view of the full embodiment of the invention.

FIG. 1 depicts an inspection lamp 10 of the present invention. A lamp casing 12 is attached to a handle 14. The handle 14 enables the inspection lamp 10 to be a portable, hand-held device. The dimensions of the inspection lamp 10, and in particular those of the lamp casing 12 and handle 14, are chosen to enable ease of use. The handle 14 may be provided means for enhancing a hand-held grip, such as a rubber material, or be ergonomically formed to emulate the contours of a gripped hand.

In one embodiment of the invention, the lamp casing 12 and handle 14 may share the same principle longitudinal axis. In such an embodiment, the inspection lamp 10 has an in-line, or "flashlight"appearance.

An on/off switch 16 is positioned on the handle 14. In a preferred embodiment, the on/off switch 16 is a push-button.

A bulb 18 is positioned within the lamp casing 12. The bulb 18 is a high intensity light source, enabling a maximum fluorescent response from a subject material. The bulb 18 is a source for a broad range of wavelengths, including ultraviolet, visible, and infra-red. The bulb 18 may be a commercially available mercury vapor, xenon, metal halide, or halogen bulb. In fact, any bulb that can provide the necessary light intensity and broad range of wavelengths is sufficient. The bulb 18 is joined to a two-pin bulb socket 20. The two-pin bulb socket 20 is mounted in a socket bracket 22.

The bulb 18 is positioned within a bulb housing 24, both within the lamp casing 12. The bulb 18 is secured to the bulb housing 24 by fastening the socket bracket 22 to a housing bracket 30 on the bulb housing 24. This may be accomplished with the use of screws (not shown). The bulb housing 24 has an open end opposite the housing bracket 30. The bulb housing 24 has a conical section 28 having a form selected for focusing light emitted from the bulb 18. An extended reflector housing 32 extends from the conical section 28. A reflector surface 26 internally lines the bulb housing 24 along the conical section 28 and the extended reflector housing 32. The bulb 18 is mounted within the bulb housing 24 such that the light source essentially encompasses the focus or foci of the reflector 26. The contour of the reflector 26 is selected to produce a close-in convergence of the emitted light. Thus, light emitted from the bulb 18 is concentrated and transmitted towards the open end of the bulb housing 24. Light is ultimately transmitted through the aperture 38 of the lamp casing 12. The focal characteristics of the bulb housing 24 and the reflector 26 can be selected to focus the transmitted light beam so as to converge at a distance from the lamp or to promote a better flood beam.

The open end of the bulb housing is adapted to receive a filter holder 34. In a preferred embodiment, the filter holder 34 is releasably attachable to the bulb housing 24. The filter holder 34 houses a filter 36. The filter of the present invention is an optical thin-film coated UV dichroic filter.

Dichroic filters are constructed to selectively reflect undesired light frequencies while transmitting desired frequencies. These filters operate by having multiple thin films or coatings applied to a surface of a filter material. The thickness of these coatings can be controlled to the point where they are applied in increments of one-quarter or one-half the wavelength of specific light colors. When these layers are applied in materials of differing refractive indices, the transmission or the reflection of specific wavelengths of light can be closely controlled. Thus, a filter can be designed to transmit specific wavelengths and reflect those which are undesirable. There is minimal absorption of light by the filter.

Figure 2:
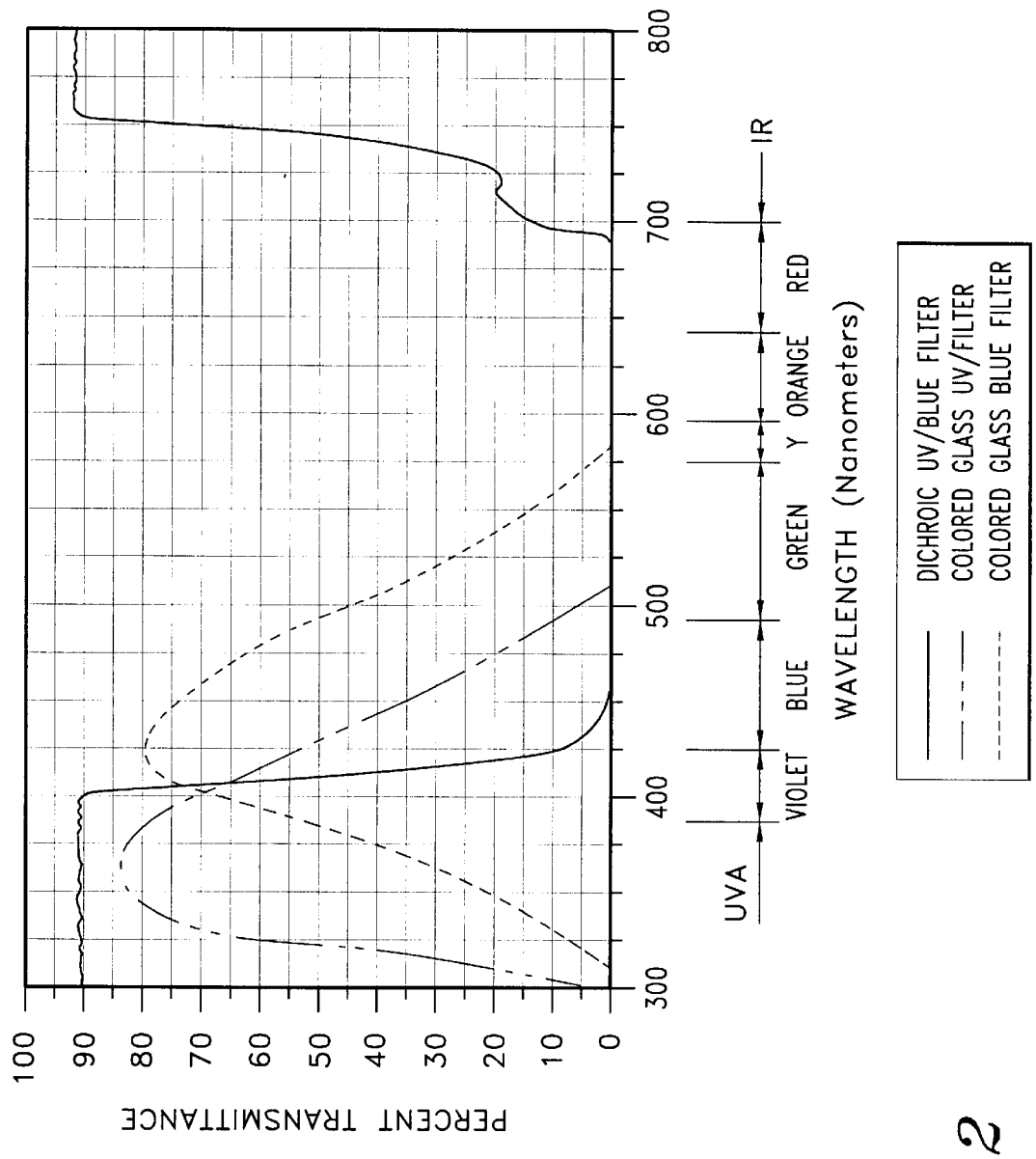
FIG. 2 is a graphical illustration of the estimated percentage of wavelength transmission for a typical filter used in the invention compared to colored glass filters currently available.

A dichroic filter for an inspection lamp can be designed to optimize the transmission of UV and blue light, and is superior to the performance of colored glass filters designed for the same purpose. An example of the transmission characteristics of a filter that may be employed in the invention is shown in FIG. 2. The dichroic filter has a higher percentage (approximately 90%) of transmittance of near ultraviolet (300–380 nm) and violet (380–400 nm) radiation than comparable colored glass filters. Even more significant is the sharp drop-off of transmittance around the 400–420 nm band compared to the long slope of the transmittance drop-off for the colored glass filters. Thus, the dichroic filter can maximize the transmission of the ultraviolet bandwidth which provides the excitation energy to cause a material to fluoresce, while reflecting the visible light in the fluorescent emission frequency band which would tend to mask the fluorescent radiation. The dichroic filter can thus be designed to have a transmission curve which has high transmittance for the excitation frequencies and almost no transmittance of the fluorescing frequencies of common, commercially available dyes used for fluorescent inspection, such as perylenes and naphthalimides. The materials then appear more brilliantly as indicators of leaks or other inspection conditions.

A dichroic filter 36 with UV and blue transmission characteristics similar to that shown in FIG. 2 is available as the B 46 Dichrolight filter and manufactured by Balzers AG in Liechtenstein. Bausch & Lomb and other companies likewise produce satisfactory dichroic filters for use in this invention.

The transmission curve of a resulting filter can be shifted by as much as 10 nm, towards longer or shorter wavelengths, by careful alteration of the coating process. Moreover, the construction of an appropriate filter may utilize a glass substrate. Because a customized transmission profile is possible, hybrid filters having thin-film coatings applied to an existing colored glass filter can be manufactured.

As also shown in FIG. 2, a dichroic filter can be designed to simultaneously transmit infra-red wavelengths. This is advantageous because the otherwise absorption or reflection of infra-red wavelengths results in thermal stress to the filter or bulb housing. Infra-red wavelengths do not interfere with a fluorescing dye's visible transmission. Thus, a dichroic filter can be designed to further facilitate heat transfer from the bulb housing.

The fact that specific portions of light can be selectively controlled provides significant benefits when applied to filters incorporated in inspection lamps which are used to fluoresce materials during inspection processes. The base material onto which the films are deposited is no longer limited to those which can resist the thermal stresses incurred when they absorb the undesirable light wavelengths. Therefore, more options are available in base materials, and the benefits which can be derived from the mechanical properties of materials which would otherwise be unusable would be available. These dichroic selective filters can also be employed as layers of filters to create a filter stack which could further refine the resulting light transmission.

There are numerous applications for an inspection lamp of the present invention. Several commercially available dyes used in leak detection applications fluoresce after being excited by ultraviolet and visible blue wavelengths. As noted above, the fluorescent response of these dyes can be maximized by selective filtering of the light transmission used to excite the dye molecules. The resulting light transmission would be much more intense and the total amount of light energy available to fluoresce a material is significantly greater, thus increasing the probability that a dye molecule will fluoresce and be observed, and a weakness in a pipe or conduit detected.

Because many materials are known to naturally fluoresce, a hand-held inspection lamp may be used for materials detection. Certain types of fungus or minerals are examples of materials whose detection would be much more efficiently achieved with an inspection lamp that can transmit specific wavelengths of electromagnetic radiation characteristic to those materials. Customized dichroic filters used in the inspection lamp of the present invention make this possible.

Non-Destructive Testing techniques require UV inspection of subject components treated with a fluorescent material. These applications often require the maximum exclusion of visible light possible. The inspection lamp of the present invention can ensure that a maximum amount of a very small band of UV light is transmitted to the exclusion of interfering visible light.

While the present invention has been described in connection with various preferred embodiments thereof, it will be appreciated that it should not be construed to be limited thereby. Modifications remain possible, without departing from the scope and spirit of the appended claims.

We claim:

1. An inspection lamp for detection of a fluorescent material which absorbs electromagnetic energy in a specific excitation frequency band and which emits electromagnetic energy in a specific fluorescent emission frequency band within the visible light spectrum, the lamp comprising:

a) a bulb housing;

b) a high intensity light source within the bulb housing;

c) a dichroic filter adapted to transmit electromagnetic radiation in the excitation frequency band and in the infrared and longer wavelength region, and to reflect electromagnetic radiation in the fluorescent emission frequency band.

2. An inspection lamp as in claim 1, wherein the excitation frequency band is in the ultraviolet and visible blue light wavelengths.

3. An inspection lamp as in claim 2, wherein the excitation frequency band is in the wavelength range of about 360 nm to about 470 nm.

4. An inspection lamp as in claim 2, wherein the dichroic filter transmits about 90 percent of the electromagnetic energy having a wavelength in the range of about 300 nm to about 380 nm.

5. An inspection lamp as in any one of claims 1 through 4, further comprising the dichroic filter being attached to the lamp by a filter holder releasably attachable to the bulb housing.

* * * * *